(12) United States Patent
Nishizaki et al.

(10) Patent No.: US 7,703,908 B2
(45) Date of Patent: *Apr. 27, 2010

(54) WATER-BASED INK SET FOR INK-JET RECORDING

(75) Inventors: Masahiro Nishizaki, Iwakura (JP); Narumi Kawai, Nagoya (JP); Junichiro Sugimoto, Aichi-ken (JP); Tomoyo Hamajima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 834 days.

This patent is subject to a terminal disclaimer.

(21) Appl. No.: 11/429,234

(22) Filed: May 8, 2006

(65) Prior Publication Data
US 2006/0268084 A1     Nov. 30, 2006

(30) Foreign Application Priority Data
May 24, 2005   (JP)   ............... 2005-150808

(51) Int. Cl.
C09D 11/00   (2006.01)
(52) U.S. Cl. ................... 347/100; 106/31.13
(58) Field of Classification Search ......... 347/100; 106/31.13
See application file for complete search history.

(56) References Cited

U.S. PATENT DOCUMENTS

| 5,609,671 | A | 3/1997 | Nagasawa |
| 5,837,045 | A | 11/1998 | Johnson et al. |
| 6,547,352 | B1 * | 4/2003 | Ikeda ................ 347/11 |
| 7,416,590 | B2 | 8/2008 | Sugimoto et al. |
| 2002/0005884 | A1 * | 1/2002 | Onishi et al. ............ 347/100 |
| 2005/0039631 | A1 * | 2/2005 | Best et al. ............ 106/31.6 |
| 2005/0235867 | A1 * | 10/2005 | Jackson et al. ......... 106/31.27 |

FOREIGN PATENT DOCUMENTS

| JP | H08 3498 | 1/1996 |
| JP | 2000 248217 | 9/2000 |
| JP | 2000 513396 | 10/2000 |

* cited by examiner

*Primary Examiner*—Stephen D Meier
*Assistant Examiner*—Laura E Martin
(74) *Attorney, Agent, or Firm*—Baker Botts L.L.P.

(57) ABSTRACT

A water-based ink set for ink-jet recording has a plurality of color inks. Each of at least one of the plurality of color inks contains a first ink and a second ink. The first ink has a first hue angle and the second ink has a second hue angle, wherein the first hue angle is not equal to the second hue angle and a differential range therebetween is a hue angle color range of a normal color of the at least one of the plurality of color inks; and a coloring agent of one of the first ink and the second ink is a pigment and a coloring agent of the other thereof is a dye.

9 Claims, 2 Drawing Sheets

——— : Example 1  L* = 40
- - - - : Comparative Example 1  L* = 40

——— : Example 1  L* = 80
- - - - : Comparative Example 1  L* = 80

WATER-BASED INK SET FOR INK-JET RECORDING

BACKGROUND OF THE INVENTION

1. Field of the Invention

The present invention relates to a water-based ink set for ink-jet recording composed of inks of a plurality of colors.

2. Description of the Related Art

When a color image is developed by use of an ink-jet recording method, a three-color ink set has been generally used which is composed of a yellow ink (Y), a magenta ink (M) and a cyan ink (C). Moreover, a four-color ink set has also been used in which a black ink (K) is further added to the three-color ink set.

In order to develop natural colors over a wide range in a color image formed by use of the above color ink sets, hue is controlled by changing the formation ratio of dots of each of the yellow, magenta and cyan inks discharged from an ink-jet head. In addition, lightness is controlled by changing the formation density of dots of each of the inks.

Recently, in order to obtain excellent image reproducibility, a combination of inks of a plurality of colors has been employed to widen a color reproducible range. Specifically, additional inks are added to the abovementioned four-color inks (Y, M, C and K) to form an ink set composed of five to seven inks. These additional inks include a yellow ink having a low color density (a light yellow ink), a magenta ink having a low color density (a light magenta ink), and a cyan ink having a low color density (a light cyan ink). Further, Japanese Patent Application Laid-Open No. 2000-248217 proposed a method in which at least one of a blue ink (B), a violet ink (V), a red ink (R), an orange ink (O) and a green ink (G) is employed in addition to the above four-color inks (Y, M, C and K).

However, the desired chromaticity and chroma saturation are not always obtained in an ink-jet recording color image even when the light yellow, light magenta and light cyan inks are added to the conventional four-color inks (Y, M, C and K). This is also the case when the additional inks including the blue ink (B), the violet ink (V), the red ink (R), the orange ink (O) and the green ink (G) are added.

Further, in the ink set employing such additional inks, the ink ejection amount on a recording material increases relative to the number of the additional inks. Thus, if a dye is employed as the coloring agent of each ink in this ink set (hereinafter, such an ink will be referred to as a dye ink), blurring or cockling becomes noticeable on a recording material, such as ordinary paper, in which blurring is prone to occur. Also, when an ink set is composed of dye inks, environmental resistance to water, light, and gas such as ozone is unsatisfactory, and thus the storage stability of an image is insufficient.

On the other hand, in the ink set employing the additional inks in addition to the conventional four-color inks (Y, M, C and K), a pigment may be employed as the coloring agent of each ink (hereinafter, such an ink will be referred to as a pigment ink). In this case, generally, blurring is suppressed on a recording material, and also environmental resistance to water, light, and gas such as ozone is excellent. However, in many cases, the chromaticity and chroma saturation developed by use of a pigment ink are not as satisfactory as those developed by use of a dye ink. Further, when an ink set is composed of pigment inks, various problems are present such as insufficient fixability on photo glossy paper.

SUMMARY OF THE INVENTION

The present invention has been made to solve the above problems. Accordingly, it is an object of the present invention to provide a water-based ink set for ink-jet recording not only in which each of the inks constituting the ink set has itself an excellent color developing property, but also in which intermediate colors can be satisfactorily developed by use of a combination of the inks. Thus, excellent color reproducibility is obtained over a wide range to thereby achieve excellent image reproducibility. At the same time, in the present ink set for ink-jet recording, blurring is suppressed even on a recording material, such as ordinary paper, in which blurring is prone to occur, and a printed material which is excellent in an image storage property is obtained.

The present inventors have found a way of achieving excellent image reproducibility in a water-based ink set for ink-jet recording comprising at least a yellow ink, a magenta ink and a cyan ink. That is, as a color ink of at least one of the yellow, magenta and cyan inks, a first ink and a second ink are employed in place of an ink having the normal color of the color ink. These first and second inks have different hue angles having therebetween the color range of the normal color of the color ink. These inks themselves develop excellent colors in the color range thereof and also develop excellent intermediate colors in combination with other inks. Therefore, the water-based ink set for ink-jet recording has a wide range of color reproducibility to thereby achieve excellent image reproducibility. Further, in this case, the present inventors have found that, by employing a pair of a dye and a pigment as the respective coloring agents of the first and second inks, blurring can be suppressed even on a recording material, such as ordinary paper, in which blurring is prone to occur. Therefore, a printed material which is excellent in an image storage property can be provided.

Therefore, the present invention provides a water-based ink set for ink-jet recording comprising a plurality of color inks, each of at least one of said plurality of color inks comprising a first ink and a second ink, said first ink having a first hue angle and said second ink having a second hue angle, wherein said first hue angle is not equal to said second hue angle and a differential range therebetween is a hue angle color range of a normal color of said at least one of said plurality of color inks; and a coloring agent of one of the first ink and the second ink is a pigment, and a coloring agent of the other thereof is a dye.

The present invention also provides the following specific embodiments (1) to (8) of the water-based ink set for ink-jet recording:

Embodiment (1) wherein said at least one of said plurality of color inks is a yellow ink, said first ink is a reddish yellow ink having the first hue angle of approximately 70° to approximately 85° and said second ink is a greenish yellow ink having the second hue angle of approximately 95° to approximately 110°, and one of the coloring agents of the reddish yellow ink and the greenish yellow ink is a pigment and the other coloring agent thereof is a dye;

Embodiment (2) wherein said at least one of said plurality of color inks is a magenta ink, said first ink is a violetish magenta ink having the first hue angle of approximately 340° to approximately 350° and said second ink is a reddish magenta ink having the second hue angle of approximately 0° to approximately 10°, and one of the coloring agents of the violetish magenta ink and the reddish magenta ink is a pigment and the other coloring agent thereof is a dye;

Embodiment (3) wherein said at least one of said plurality of color inks is a cyan ink, said first ink is a greenish cyan ink having the first hue angle of approximately 230° to approximately 240° and said second ink is a bluish cyan ink having the second hue angle of approximately 250° to approximately 260°, and one of the coloring agents of the greenish cyan ink and the bluish cyan ink is a pigment and the other coloring agent thereof is a dye;

Embodiment (4) wherein the coloring agents of the inks are composed such that the dyes and the pigments are alternately arranged in order of hue angle;

Embodiment (5) wherein said at least one of said plurality of color inks are a yellow ink and a magenta ink;

said first ink of said yellow ink is a reddish yellow ink having the first hue angle of approximately 70° to approximately 85° and employing a dye as the coloring agent, and said second ink of said yellow ink is a greenish yellow ink having the second hue angle of approximately 95° to approximately 110° and employing a pigment as the coloring agent; and said first ink of said magenta ink is a violetish magenta ink having the first hue angle of approximately 340° to approximately 350° and employing a dye as the coloring agent, and said second ink of the magenta ink is a reddish magenta ink having the second hue angle of approximately 0° to approximately 10° and employing a pigment as the coloring agent;

Embodiment (6) wherein said at least one of said plurality of color inks are a magenta ink and a cyan ink;

said first ink of said magenta ink is a violetish magenta ink having the first hue angle of approximately 340° to approximately 350° and employing a dye as the coloring agent, and said second ink of the magenta ink is a reddish magenta ink having the second hue angle of approximately 0° to approximately 10° and employing a pigment as the coloring agent; and said first ink of said cyan ink is a greenish cyan ink having the first hue angle of approximately 230° to approximately 240° and employing a dye as the coloring agent, and said second ink of said cyan ink is a bluish cyan ink having the second hue angle of approximately 250° to approximately 260° and employing a pigment as the coloring agent;

Embodiment (7) wherein said at least one of said plurality of color inks are a yellow ink and a cyan ink;

said first ink of said yellow ink is a reddish yellow ink having the first hue angle of approximately 70° to approximately 85° and employing a dye as the coloring agent, and said second ink of said yellow ink is a greenish yellow ink having the second hue angle of approximately 95° to approximately 110° and employing a pigment as the coloring agent; and said first ink of said cyan ink is a greenish cyan ink having the first hue angle of approximately 230° to approximately 240° and employing a dye as the coloring agent, and said second ink of said cyan ink is a bluish cyan ink having the second hue angle of approximately 250° to approximately 260° and employing a pigment as the coloring agent; and Embodiment (8) wherein said at least one of said plurality of color inks are a yellow ink, a magenta ink and a cyan ink: said first ink of said yellow ink is a reddish yellow ink having the first hue angle of approximately 70° to approximately 85° and employing a dye as the coloring agent, and said second ink of said yellow ink is a greenish yellow ink having the second hue angle of approximately 95° to approximately 110° and employing a pigment as the coloring agent;

said first ink of said magenta ink is a violetish magenta ink having the first hue angle of approximately 340° to approximately 350° and employing a dye as the coloring agent, and said second ink of the magenta ink is a reddish magenta ink having the second hue angle of approximately 0° to approximately 10° and employing a pigment as the coloring agent; and said first ink of said cyan ink is a greenish cyan ink having the first hue angle of approximately 230° to approximately 240° and employing a dye as the coloring agent, and said second ink of said cyan ink is a bluish cyan ink having the second hue angle of approximately 250° to approximately 260° and employing a pigment as the coloring agent.

In the water-based ink set for ink-jet recording of the present invention, each of at least one of a plurality of color inks such as the yellow (Y), magenta (M) and cyan (C) inks employed for developing a color image is composed of a first ink and a second ink. The first ink has a first hue angle and the second ink has a second hue angle, wherein the first hue angle is not equal to the second hue angle and a differential range therebetween is the color range of the normal color of the color ink. As these first and second inks, an ink may be properly selected which develops excellent color in the color range of the ink itself. Further, by employing the first and second inks in combination, colors in the normal color range between the colors of these inks can be developed with high chroma saturation. In addition, by employing these inks in combination with other ink, excellent intermediate colors can be developed. Therefore, according to the water-based ink set for ink-jet recording of the present invention, excellent color reproducibility is obtained over a wide range to thereby achieve excellent image reproducibility.

Moreover, in the water-based ink set for ink-jet recording of the present invention, in which the first and second inks have different hue angles having therebetween the color range of the normal color, one of the coloring agents of these inks is a dye, and the other thereof is a pigment. Therefore, when the normal color is developed by employing the first and second inks in combination, both a dye ink and a pigment ink are used for printing. In this manner, as compared to when the normal color is developed by use of a combination of dye inks only, blurring is suppressed even on a recording material, such as ordinary paper, in which blurring is prone to occur. Also, a printed material which is excellent in an image storage property can be provided. In addition, as compared to when the normal color is developed by use of a combination of pigment inks only, the desired chromaticity and choroma saturation can be obtained. In one aspect of the water-based ink set for ink-jet recording of the present invention, the coloring agents of the inks constituting the ink set may be composed such that the dyes and the pigments are alternately arranged in order of hue angle. Particularly in this case, when a given color is developed to form a full color image, both a dye ink and a pigment ink are used for printing. Therefore, a full color image can be formed in which blurring is suppressed and which exhibits an excellent image storage property and excellent image reproducibility.

DETAILED DESCRIPTION OF THE PREFERRED EMBODIMENTS

Figure 1:
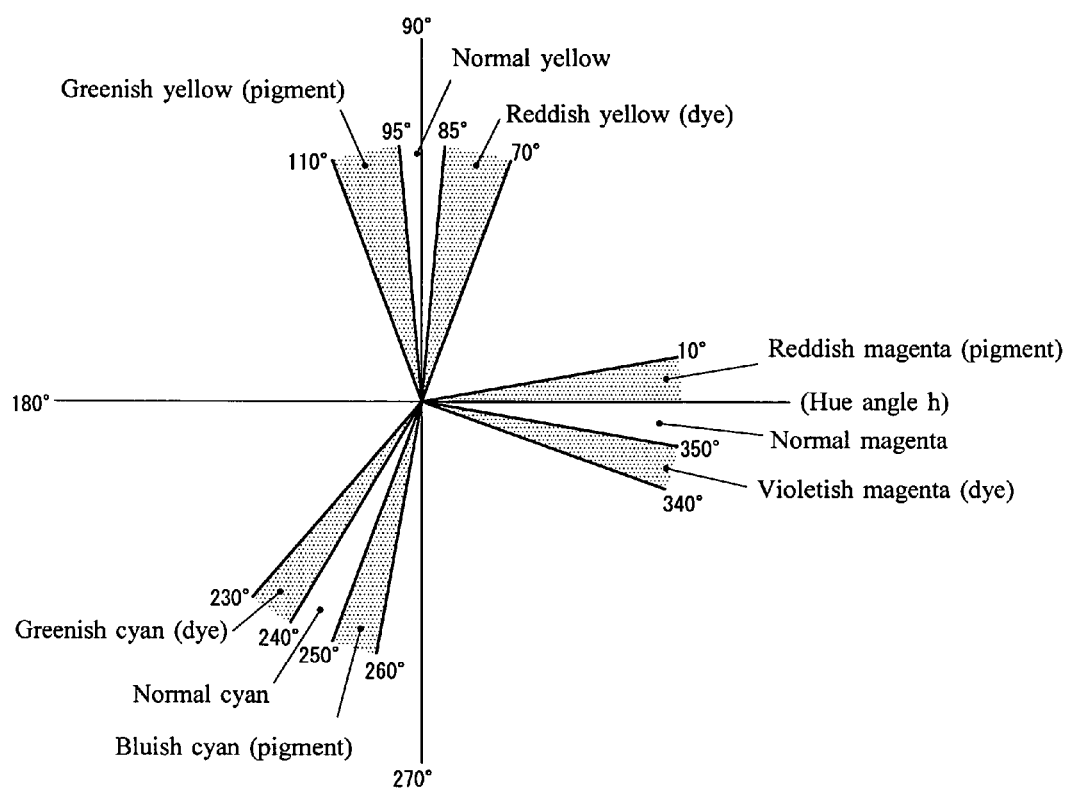
FIG. 1 is a drawing for explaining a hue angle (h) and a color range.

The present invention will next be described in detail.

In the present invention, hue angle (h) is based on the L*a*b* calorimetric system standardized by the Commission Internationale de l'Eclairage (CIE) in 1976. This calorimetric system is also defined in JIS (Japanese Industrial Standards) Z 8729.

The water-based ink set for ink-jet recording of the present invention comprises a plurality of color inks. This water-based ink set is characterized in that a color ink of at least one of these inks is composed of a first ink and a second ink which have different colors having therebetween the color range of the normal color of the color ink. In addition, this water-based ink set is characterized in that one of the coloring agents of the first and second inks is a pigment, and the other coloring agent thereof is a dye.

As used herein, the normal color is a color obtained by use of a single ink of a conventional yellow (Y), magenta (M) or cyan (C) ink. More specifically, in the case of the yellow ink, the normal color has a color range having a lightness (L*) of approximately 85 to approximately 90 and a hue angle (h) of more than approximately 85° and less than approximately 95°. In the case of the magenta ink, the normal color has a color range having a lightness (L*) of approximately 40 to approximately 60 and a hue angle (h) of more than approximately 350° and less than approximately 360°. Further, in the case of the cyan ink, the normal color has a color range having a lightness (L*) of approximately 50 to approximately 65 and a hue angle (h) of more than approximately 240° and less than approximately 250°.

In the present invention, the value of the hue angle (h) of each of the inks is obtained by measuring the color in a printed material by means of a spectrocolorimeter. In this case, the printed material is printed such that an area on recording paper is fully covered with each ink (solidly printed) at a resolution of 1,200×1,200 dpi by use of an ink-jet printer. Further, the recording paper employed for the printing has a grammage of approximately 65 to approximately 100 g/cm$^2$, a thickness of approximately 80 to approximately 110 µm, a whiteness of approximately 80% or higher, and an opacity of approximately 75% or higher. Specific examples of recording paper having the above specifications include, but are not limited to, Great White MultiUse 20 paper (product of International Paper Company), Data Copy (product of M-real), 4200 DP 201b (product of XEROX Corporation) and the like.

Examples of ink-jet printers which can be employed for the solidly printing of the printed material include a digital multifunction device equipped with an ink-jet printer (MFC-5200J, product of Brother Industries, Ltd.) and the like. Examples of the spectrocolorimeter which can be used include SC-T (product of Suga Test Instruments Co., Ltd.), Spectrolino (product of Gretag Macbeth) and the like.

The hue angle (h) can be measured by use of light source $D_{65}$ at a viewing angle of 2°. Further, an L* value of 85 to 90 is employed for yellow-based inks (a reddish yellow ink, a greenish yellow ink and a normal yellow ink). An L* value of 40 to 60 is employed for magenta-based inks (a violetish magenta ink, a reddish magenta ink and a normal magenta ink), and an L* value of 50 to 65 is employed for cyan-based inks (a greenish cyan ink, a bluish cyan ink and a normal cyan ink).

In the ink set of the present invention, the first and second inks may be employed in place of a normal color ink of the yellow, magenta or cyan ink. These first and second inks have different hue angles (h) having therebetween the color range of the normal color ink. In this case, each of the first and second inks employed has a color similar to that of the normal color ink. In this manner, the chroma saturation of the normal color is improved, and color reproducibility can be enhanced in the color range of the colors similar to the normal color while the color reproducibility of the normal color is sufficiently ensured.

More specifically, as the yellow ink, the first and second inks may be employed which have therebetween the color range of the normal yellow color as shown in FIG. 1. In this case, preferably, a reddish yellow ink having a hue angle (h) of approximately 70° to approximately 85° is employed as the first ink, and a greenish yellow ink having a hue angle (h) of approximately 95° to approximately 110° is employed as the second ink. If the hue angle (h) of the first ink is smaller than approximately 70°, the color reproducibility of the yellow color is not broadened even when the second ink is employed, and the color range of the normal yellow color cannot be developed. Also, if the hue angle (h) of the first ink is larger than approximately 85°, the color reproducibility of the yellow color is not broadened even when the second ink is employed. Further, if the hue angle (h) of the second ink is smaller than approximately 95°, the color reproducibility of the yellow color is not broadened even when the first ink is employed. Also, if the hue angle (h) of the second ink is larger than approximately 110°, the color reproducibility of the yellow color is not broadened even when the first ink is employed, and the color range of the normal yellow color cannot be developed.

As the magenta ink, the first and second inks may be employed which have therebetween the color range of the normal magenta color. In this case, preferably, a violetish magenta ink having a hue angle (h) of approximately 340° to approximately 350° is employed as the first ink, and a reddish magenta ink having a hue angle (h) of approximately 0° to approximately 10° is employed as the second ink. If the hue angle (h) of the first ink is smaller than approximately 340°, the color reproducibility of the magenta color is not broadened even when the second ink is employed, and the color range of the normal magenta color cannot be developed. Also, if the hue angle (h) of the first ink is larger than approximately 350°, the color reproducibility of the magenta color is not broadened even when the second ink is employed. Further, if the hue angle (h) of the second ink is smaller than approximately 0°, the color reproducibility of the magenta color is not broadened even when the first ink is employed. Also, if the hue angle (h) of the second ink is larger than approximately 10°, the color reproducibility of the magenta color is not broadened even when the first ink is employed, and the color range of the normal magenta color cannot be developed.

Similarly, as the cyan ink, the first and second inks may be employed which have therebetween the color range of the normal cyan color. In this case, preferably, a greenish cyan ink having a hue angle (h) of approximately 230° to approximately 240° is employed as the first ink, and a bluish cyan ink having a hue angle (h) of approximately 250° to approximately 260° is employed as the second ink. If the hue angle (h) of the first ink is smaller than approximately 230°, the color reproducibility of the cyan color is not broadened even when the second ink is employed, and the color range of the normal cyan color cannot be developed. Also, if the hue angle (h) of the first ink is larger than approximately 240°, the color reproducibility of the cyan color is not broadened even when the second ink is employed. Further, if the hue angle (h) of the second ink is smaller than approximately 250°, the color reproducibility of the cyan color is not broadened even when the first ink is employed. Also, if the hue angle (h) of the second ink is larger than approximately 260°, the color reproducibility of the cyan color is not broadened even when the first ink is employed, and the color range of the normal cyan color cannot be developed.

In the ink set of the present invention, any one or more inks selected from among the yellow, magenta and cyan inks may be composed of the corresponding first and second inks having therebetween the color range of the corresponding normal color described above. Further, all of the yellow, magenta and cyan inks may be composed of the corresponding first and second inks having therebetween the color range of the corresponding normal color.

As mentioned above, in the ink set of the present invention, any one or more inks selected from among the yellow, magenta and cyan inks may be composed of the corresponding first and second inks having therebetween the color range of the corresponding normal color described above. In this case, preferably, a pair of a dye and a pigment is employed as the coloring agents of the first and second inks having similar colors. Specifically, if the first ink is a dye ink, the second ink is a pigment ink. Alternatively, if the first ink is a pigment ink, the second ink is a dye ink. Particularly preferably, the coloring agents of the inks are composed such that the dyes and the pigments are alternately arranged in order of hue angle. In this manner, when a desired color is developed by combining a plurality of inks having hue angles adjacent to each other, both a dye ink and a pigment ink are always included in the combination of the inks. Thus, as compared to the case where a combination of dye inks only is employed to develop a color, blurring is suppressed on a recording material, such as ordinary paper, in which blurring is prone to occur. Hence, a printed material having an excellent image storage property can be provided. In addition, as compared to the case where a combination of pigment inks only is employed to develop a color, the desired chromaticity and chroma saturation can be obtained.

In a pair of the first and second inks having therebetween the color range of the normal color, either of a dye ink and a pigment ink may be employed as the first ink or the second ink. This may be properly determined according to the availability of the dye or the pigment in the corresponding color range and the light fastness required in the corresponding color range. For example, generally, red and blue colors are frequently employed in text, lines and the like, and thus excellent light fastness is required for these colors. In order to respond the requirement, if a violetish magenta ink having a hue angle (h) of approximately 340° to approximately 350° and a reddish magenta ink having a hue angle (h) of approximately 0° to approximately 10° are employed as the magenta ink, a pigment ink is preferably employed as the reddish magenta ink. Similarly, if a greenish cyan ink having a hue angle (h) of approximately 230° to approximately 240° and a bluish cyan ink having a hue angle (h) of approximately 250° to approximately 260° are employed as the cyan ink, a pigment ink is preferably employed as the bluish cyan ink. When a pigment ink is employed as each of the reddish magenta ink and the bluish cyan ink as described above, a dye or a pigment may be properly employed as the coloring agent of the rest of the inks constituting the ink set. Specifically, the dye inks and the pigment inks are alternately arranged in order of hue angle.

Examples of the ink set having the abovementioned ink combination include an ink set composed of inks each having a hue angle (h) within the color range shown in FIG. 1 and each employing a coloring agent noted as dye or pigment in FIG. 1. Specifically, the yellow ink is composed of a reddish yellow ink and a greenish yellow ink. The reddish yellow ink employs a dye as the coloring agent and has a hue angle (h) of approximately 70° to approximately 85°, and the greenish yellow ink employs a pigment as the coloring agent and has a hue angle (h) of approximately 95° to approximately 110°. The magenta ink is composed of a violetish magenta ink and a reddish magenta ink. The violetish magenta ink employs a dye as the coloring agent and has a hue angle (h) of approximately 340° to approximately 350°, and the reddish magenta ink employs a pigment as the coloring agent and has a hue angle (h) of approximately 0° to approximately 10°. Further, the cyan ink is composed of a greenish cyan ink and a bluish cyan ink. The greenish cyan ink employs a dye as the coloring agent and has a hue angle (h) of approximately 230° to approximately 240°, and the bluish cyan ink employs a pigment as the coloring agent and has a hue angle (h) of approximately 250° to approximately 260°.

In the present invention, preferably, only one of a dye and a pigment is employed as the coloring agent of each of the inks. If both a dye and a pigment are employed in one ink as the coloring agent, the coloring agent (particularly a pigment) aggregates. Thus, disadvantageously, clogging occurs in a nozzle or the like of an ink-jet recording head to cause the ejection performance to significantly deteriorate.

Further, when each of the inks contains either a dye or a pigment as the coloring agent, the ink may employ a single kind of the coloring agent or may employ a plurality of kinds of the coloring agents to obtain the desired hue angle (h).

More specifically, examples of the coloring agent of the reddish yellow ink having a hue angle (h) of approximately 70° to approximately 85° and the greenish yellow ink having a hue angle (h) of approximately 95° to approximately 110° include, but are not limited to: water soluble dyes such as C. I. Acid Yellows 23 and 99, C. I. Direct Yellows 86, 132 and 142, and the like; pigments such as C. I. Pigment Yellows 12, 13, 14, 17, 74, 81, 83, 97, 120, 139, 151, 154, 155, 165, 173, 180, 213 and 214, C. I. Pigment Oranges 13, 34, 36 and 43, and the like; and pigment dispersions containing these pigments.

Examples of the coloring agent of the violetish magenta ink having a hue angle (h) of approximately 340° to approximately 350° and the reddish magenta ink having a hue angle (h) of approximately 0° to approximately 10° include, but are not limited to: water soluble dyes such as C. I. Direct Red 80, C. I. Acid Red 254, and the like; pigments such as C. I. Pigment Reds 5, 48:1, 48:2, 48:3, 48:4, 57:1, 122, 146, 147, 176, 184, 185, 187, 209, 210, 237, 238, 247, 257 and 266, C. I. Pigment Violets 19 and 32, and the like; and pigment dispersions containing these pigments.

Examples of the coloring agent of the greenish cyan ink having a hue angle (h) of approximately 230° to approximately 240° and the bluish cyan ink having a hue angle (h) of approximately 250° to approximately 260° include, but are not limited to: water soluble dyes such as C. I. Acid Blues 9, 86 and 112, C. I. Direct Blues 87 and 199, C. I. Acid Greens 3, 7, 15 and 25, and the like; pigments such as C. I. Pigment Blues 15:1, 15:2, 15:3, 15:4, 28, 56, 60 and 61, C. I. Pigment Violets 23 and 37, C. I. Pigment Greens 7 and 36, and the like; and pigment dispersions containing these pigments.

The above coloring agents are examples of the coloring agent suitable for each of the inks constituting the ink set of the present invention. In order to obtain the desired hue angle, the coloring agent employed may be properly selected from among various coloring agents including the above coloring agents.

A black ink may be included in the ink set of the present invention in accordance with need. Either of a dye and a pigment may be employed as the coloring agent of the black ink. Specific examples of the dye which can be employed include, but are not limited to, water soluble dyes such as C. I. Acid Blacks 2, 7, 24, 26, 31, 52, 63, 112 and 118, C. I. Basic Black 2, and the like. Specific examples of the pigment which can be employed include, but are not limited to, carbon blacks such as MA8, MA100 (products of Mitsubishi Chemical Corporation), color black FW200 (product of Degussa) and the like. As the carbon black, a self-dispersing type carbon black which can be dispersed in water without using a dispersing agent may be employed. The self-dispersing type carbon black can be obtained by subjecting a carbon black to a surface treatment in which at least one compound containing a hydrophilic group such as a carbonyl group, a carboxyl group, a hydroxyl group, a sulfone group or a salt thereof is bound to the surface of the carbon black. Specific examples of the surface treatment include a method disclosed in U.S. Pat. No. 5,609,671 and a method disclosed in WO97/48769. As the self-dispersing type carbon black, a commercial product such as CAB-O-JET (a registered trade mark) 200, 300 (products of Cabot Corporation), BONJET (a registered trade mark) CW1 (product of Orient Chemical Industries, Ltd.) or the like may be employed.

The amount of the coloring agent in each of the inks depends on the type of the coloring agent, the desired print density and color, and the like. If the coloring agent is a water soluble dye, the amount thereof (the amount of the dye as a solid with respect to the total amount of the ink) is in the range of preferably approximately 0.1 to approximately 10 wt. %, more preferably approximately 0.3 to approximately 10 wt. %, and particularly preferably approximately 0.5 to approximately 7 wt. %. The amount less than approximately 0.1 wt. % is not preferable since the color is unsatisfactorily developed. Also, the amount more than approximately 10 wt. % is not preferable since clogging of a nozzle or the like of an ink-jet recording head or the precipitation of the dye occurs. Also, if the coloring agent is a pigment or a pigment dispersion, the amount thereof (the amount of the pigment as a solid with respect to the total amount of the ink) is preferably approximately 1 to approximately 10 wt. %, and more preferably approximately 1 to approximately 7 wt. %. The amount less than approximately 1 wt. % is not preferable since the color is unsatisfactorily developed. Also, the amount more than approximately 10 wt. % is not preferable since clogging of a nozzle or the like of an ink-jet recording head or the precipitation of the pigment occurs.

Each of the inks constituting the ink set for ink-jet recording contains at least water and at least one water soluble organic solvent in addition to the abovementioned coloring agent.

The kind of the water soluble organic solvent in each of the inks does not particularly depend on whether the coloring agent of each of the inks is a dye or a pigment. Preferably, a polyhydric alcohol alkyl ether having a low odor and a low vapor pressure is employed as the water soluble organic solvent. The polyhydric alcohol alkyl ether acts as a penetrant which effectively enhances the penetration rate of ink into a recording material such as recording paper. Hence, the drying characteristics of ink on a recording material can be improved, thereby preventing bleeding (blurring at a boundary of different colors) caused by the slow drying characteristics of inks on a recording material. In addition, the occurrence of feathering (fine scale blurring on a recording material caused by the presence of fibers and spaces) associated with the penetration of ink can be reduced.

Specific examples of the polyhydric alcohol alkyl ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like.

The amount of the polyhydric alcohol alkyl ether with respect to the total amount of each ink is in the range of preferably approximately 0.3 to approximately 15 wt. %, and more preferably approximately 0.4 to approximately 10 wt. %. If the amount is less than approximately 0.3 wt. %, the penetration rate of the ink into a recording material such as recording paper is low, and thus problems are likely to arise in drying time and blurring. On the other hand, if the amount exceeds approximately 15 wt. %, the penetration of the ink into a recording material is enhanced. In this case, the ink may reach the back of a recording material, and problems are likely to arise in blurring.

In addition to the above, a monohydric alcohol such as ethanol or isopropyl alcohol may be employed as the penetrant of the ink.

Preferably, together with the abovementioned penetrant, a humectant is employed as the water soluble organic solvent. The humectant is employed for preventing clogging of a nozzle or the like of an ink-jet head. Specific examples of the humectant include, but are not limited to, water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol and 1,6-hexanediol. If the amount of the water soluble organic solvent serving as the humectant is too low, the clogging of a nozzle or the like of an ink-jet head is not satisfactorily prevented. If the amount is too high, the viscosity of the ink increases to cause difficulty in ejecting. Therefore, the amount of the water soluble organic solvent with respect to the total amount of the corresponding ink is in the range of preferably approximately 5 to approximately 50 wt. %, more preferably approximately 5 to approximately 40 wt. %, and particularly preferably approximately 5 to approximately 35 wt. %.

Preferably, high purity water such as ion-exchanged water or distilled water is used as the water employed in each ink. The amount of the water with respect to the total amount of each ink is in the range of preferably approximately 10 to approximately 98 wt. %, more preferably approximately 30 to approximately 97 wt. %, and most preferably approximately 40 to approximately 95 wt. %. If the amount is less than approximately 10 wt. %, the viscosity of the ink increases to cause the ink to be difficult to inject. If the amount exceeds approximately 98 wt. %, the coloring agent precipitates or aggregates due to the evaporation of water. Thus, disadvantageously, clogging is likely to occur in a nozzle of an ink-jet recording head.

In addition to the abovementioned components, other various agents such as a dispersing agent, a viscosity modifier, a surface tension modifier, a pH modifier, a preservative and a mildewproofing agent may be added to each of the inks in accordance with need.

The water-based ink set for ink-jet recording of the present invention is applicable to ink-jet recording methods such as an electrostatic attraction method, a method using a piezoelectric element and a thermal method.

EXAMPLES

The present invention will next be specifically described by way of Examples.

Examples 1 to 4 and Comparative Examples 1 to 6

(1) Preparation of Inks (1-1) Preparation of Pigment Inks

A greenish yellow ink (YG-P, a pigment ink) was prepared as follows.

3 parts by weight of C. I. Pigment Yellow 155, 1 part by weight of polyoxyethylene lauryl ether ammonium sulfate (average polymerization degree of oxyethylene=12), 3 parts by weight of glycerin and 13 parts by weight of water were mixed. Subsequently, the mixture was subjected to a dispersion treatment by means of a wet sand mill using zirconia beads having a diameter of 0.3 mm as a medium to thereby obtain a greenish yellow pigment dispersion.

Separately, 63 parts by weight of ultrapure water, 15 parts by weight of glycerin and 2 parts by weight of dipropylene glycol-n-propyl ether were mixed to prepare 80 parts by weight of an ink solvent.

80 parts by weight of the obtained ink solvent was gradually added to 20 parts by weight of the above greenish yellow pigment dispersion under stirring. The mixture was continued to stir for 30 minutes and filtrated with a membrane filter having a pore size of 1 μm to obtain the greenish yellow ink (YG-P). The blending amount of C. I. Pigment Yellow 155 with respect to the total amount of ink was 3 wt. %.

The same procedure as in the preparation example of the greenish yellow ink (YG-P) was repeated to prepare other pigment inks shown in Table 1, except that the ink composition was changed as listed in Table 1.

(1-2) Preparation of Dye Inks

A reddish yellow ink (YR-D, a dye ink) was prepared as follows.

79.2 parts by weight of water, 18 parts by weight of glycerin and 0.5 parts by weight of tripropylene glycol butyl ether were mixed to prepare 97.7 parts by weight of an ink solvent. Subsequently, 2.3 parts by weight of C. I. Direct Yellow 86 was added to the ink solvent under stirring. The mixture was continued to stir for 30 minutes and filtrated with a membrane filter having a pore size of 1 μm to obtain the reddish yellow ink (YR-D).

The same procedure as in the preparation example of the reddish yellow ink (YR-D) was repeated to prepare other dye inks shown in Table 1, except that the ink composition was changed as listed in Table 1.

(2) Measurement of the Hue Angle (h)

Each of the prepared inks was filled into a predetermined ink cartridge, and the ink cartridge was attached to a digital multifunction device equipped with an ink-jet printer (MFC-5200J, product of Brother Industries, Ltd.). Subsequently, printing was performed on recording paper (Great White MultiUse 20 paper, product of International Paper Company) at a resolution of 1,200×1,200 dpi such that an area is fully covered with the ink.

The obtained printed materials were measured for the hue angle (h) (light source: $D_{65}$, viewing angle: 2°) by means of a spectrocolorimeter (SC-T, product of Suga Test Instruments Co., Ltd.). The hue angle (h) was obtained in L*=85 to 90 for the materials printed by use of the yellow-based inks, in L*=40 to 60 for the materials printed by use of the magenta-based inks and in L*=50 to 65 for the materials printed by use of the cyan-based inks. The measurement results are shown in Table 1.

(3) Printing Test

The ink sets of Examples 1 to 4 and Comparative Examples 1 to 6 were constituted by combining the inks shown in Table 1 with a commercial normal yellow dye ink, a commercial normal magenta dye ink and a commercial normal cyan dye ink, as shown in Table 2. The commercial normal yellow dye ink was ink cartridge LC600Y for MFC-5200J (hue angle h=93°). Also, the commercial normal magenta dye ink was ink cartridge LC600M for MFC-5200J (hue angle h=354°) and the commercial normal cyan dye ink was ink cartridge LC600C for MFC-5200JC (hue angle h=244°). All of the commercial inks are the products of Brother Industries, Ltd.

The inks of each of the ink sets were filled into predetermined ink cartridges, and patch patterns containing various hues at predetermined L* values were printed as follows to perform the printing test. In this test, a digital multifunction device equipped with an ink-jet printer (MFC-5200J, product of Brother Industries, Ltd.) was used as a printer, and photo glossy paper BP60GLA (product of Brother Industries, Ltd.) was used as paper for evaluation.

If the number of inks constituting the ink set is four or less, the printing test was performed by attaching all of the ink cartridges constituting the ink set to the printer. Upon printing, a printer driver capable of printing patch patterns containing various hues was used to perform the test.

If the number of inks constituting the ink set is five or six, the cartridges containing the inks were divided into two groups for convenience. The two groups of the ink cartridges were separately attached to the printer to perform the printing test. For example, if the number of inks constituting the ink set is six, the six cartridges containing the inks were numbered as 1, 2, 3, 4, 5 and 6 in increasing order of the hue angle of the inks. First, four ink cartridges including the ink cartridges 1, 2, 3 and 4 were attached to the printer to perform the printing test. Subsequently, four ink cartridges including the previously tested cartridges 1 and 4 and the untested cartridges 5 and 6 were attached to the printer to perform the printing test. The ink of the ink cartridge 4 has the largest hue angle among the previously tested inks, and the ink of the ink cartridge 1 has the smallest hue angle among the previously tested inks. Upon printing, a printer driver capable of printing patch patterns containing various hues was used to perform the test. According to this printing method, printing by use of five or six ink cartridges attached simultaneously to a printer can be simulated by use of a printer to which only four ink cartridges can be attached.

(4) Evaluation of Color Reproducibility

The color of the patch patterns printed in the above-mentioned (3) was measured by means of a spectrocolorimeter (Spectrolino, product of Gretag Macbeth) to determine a* values and b* values. Subsequently, color reproduction ranges were determined at L*=40, 50, 60, 70 and 80, and the areas thereof were determined.

Figure 2:
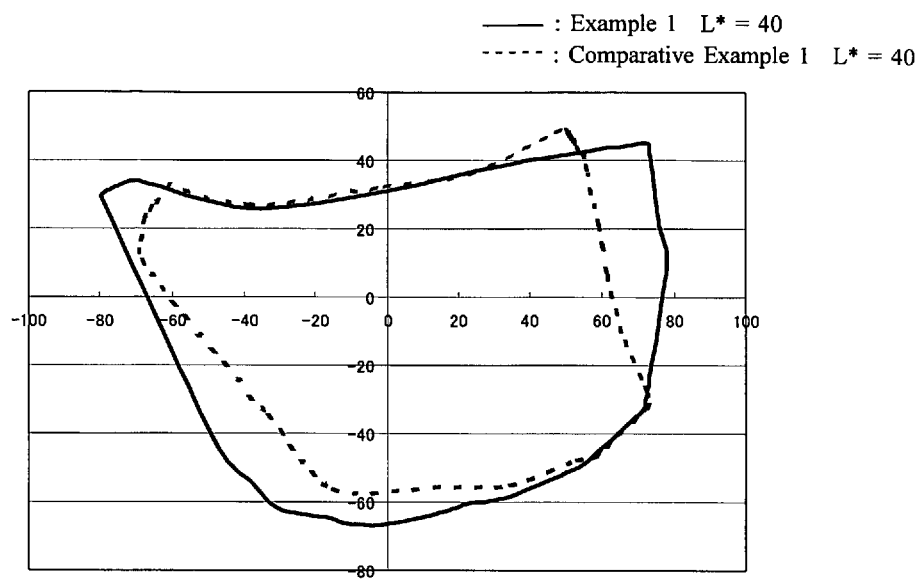
FIG. 2 is a graph illustrating a color reproduction range at $L^*=40$ for Example 1 and Comparative Example 1.
Figure 3:
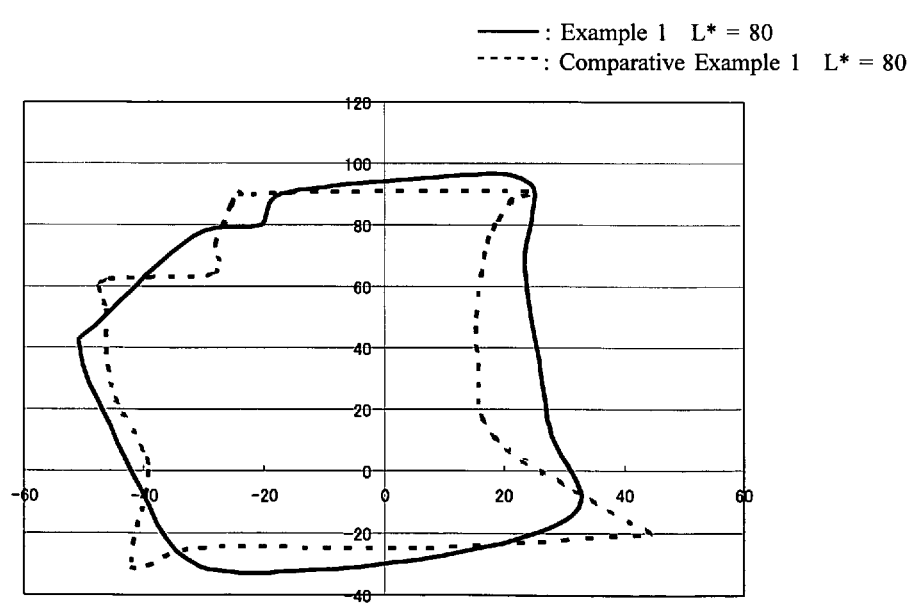
FIG. 3 is a graph illustrating the color reproduction range at L*=80 for Example 1 and Comparative Example 1.

FIG. 2 is a graph of the color reproduction range at L*=40 for Example 1 and Comparative Example 1, and FIG. 3 is a graph of the color reproduction range at L*=80 for Example 1 and Comparative Example 1. As can be seen in FIGS. 2 and 3, the color reproduction range of Example 1 is extended as compared to that of Comparative Example 1 at both L*=40 and 80.

The ratio of the color reproduction area of each of Examples and Comparative Examples to that of Comparative Example 1 at the same L* value was determined. The color reproducibility was evaluated from the obtained results by use of the following criteria. The results are shown in Table 2.

A: More than 110%
B: More than 105% and 110% or less
C: More than 90% and 105% or less
D: 90% or less Overall evaluation of the color reproducibility was made as follows. If the total number of the ranks A and B in the five evaluation results at L*=40, 50, 60, 70 and 80 for each ink set is three or more, and if the rank D is not included in the five evaluation results, the rank "Good" was given to the ink set. The rank "Good" represents that the overall color reproducibility of the ink set is better than that of a commercial ink set (Comparative Example 1). For the other cases, the rank "No Good" was given to the ink set. These results are also shown in Table 2.

(5) Evaluation of Light Fastness

A light exposure test was performed by means of a high energy xenon weather meter SC750-WN (product of Suga Test Instruments Co., Ltd.) on the patch patterns printed by means of the method described in the above-mentioned (3). In this case, a xenon lamp was employed as a light source, and the irradiation was performed for 30 hours at a room temperature of 25° C., a humidity of 50% RH, and an irradiance of 100 W/m$^2$ (300 to 400 nm).

For each of Examples and Comparative Examples, the change in the image quality before and after the light exposure test was visually observed and was evaluated by the following criteria having three ratings. The results are shown in Table 2.

A: No differences were found in the image quality before and after the light exposure test.

B: Differences were found in the image quality before and after the light exposure test.

C: Color change (color fading) was evidently found before and after the light exposure test.

(6) Evaluation of Blurring

By means of a similar method as in the above-mentioned (3), letters and ruled line patterns were printed on ordinary paper (Great White MultiUse 20 paper, product of International Paper Company) by use of the ink set of each of Examples and Comparative Examples. Blurring on the obtained printed materials was visually observed and evaluated by the following criteria having three ratings. The results are shown in Table 2.

A: The letters and the ruled lines were sharp, and no blurring was found. The letters were clearly readable regardless of the size thereof.

B: The letters and the ruled lines were not sharp, and blurring was found. However, the letters were clearly readable regardless of the size thereof.

C: The letters and the ruled lines were not sharp, and blurring was found. Small letters were hard to read.

TABLE 1

| | | (Y) | | | | | |
|---|---|---|---|---|---|---|---|
| | | Reddish yellow ink | | Greenish yellow ink | | Normal yellow ink | |
| | | YR-P | YR-D | YG-P | YG-D | YN-P | YN-D |
| | Type of coloring agent | Pigment | Dye | Pigment | Dye | Pigment | Dye |
| Ink composition (wt %) | C.I. Acid Yellow 23 | | | | | | 1.5 |
| | C.I. Acid Yellow 132 | | | | 2.5 | | |
| | C.I. Direct Yellow 86 | | 2.3 | | | | 1.5 |
| | C.I. Pigment Yellow 155 | 3.8 | | 3.0 | | | |
| | C.I. Pigment Yellow 83 | | | | | 5.0 | |
| | C.I. Direct Red 80 | | | | | | |
| | C.I. Acid Red 249 | | | | | | |
| | C.I. Acid Red 254 | | | | | | |
| | C.I. Pigment Red 122 | 0.25 | | | | | |
| | C.I. Acid Blue 112 | | | | | | |
| | C.I. Direct Blue 86 | | | | | | |
| | C.I. Direct Blue 199 | | | | | | |
| | C.I. Pigment Blue 15:3 | | | | | | |
| | C.I. Acid Green 3 | | | | | | |
| | Glycerin | 30.0 | 18.0 | 18.0 | 30.0 | 18.0 | 18.0 |
| | Dipropylene glycol-n-propyl ether | | | 2.0 | | 2.0 | 2.0 |
| | Triethylene glycol butyl ether | 3.5 | | | 4.0 | | |
| | Tripropylene glycol butyl ether | | 0.5 | | | | |
| | Polyoxyethylene lauryl ether ammonium sulfate (*1) | 1.0 | | 1.0 | | 1.0 | |
| | Ultra pure water | Balance | Balance | Balance | Balance | Balance | Balance |
| | h value/° | 81.2 | 84.1 | 100.2 | 99.3 | 89.6 | 94.5 |

TABLE 1

| | | (M) | | | | | |
|---|---|---|---|---|---|---|---|
| | | Violetish magenta ink | | Reddish magenta ink | | Normal magenta ink | |
| | | MV-P | MV-D | MR-P | MR-D | MN-P | MN-D |
| | Type of coloring agent | Pigment | Dye | Pigment | Dye | Pigment | Dye |
| Ink composition (wt %) | C.I. Acid Yellow 23 | | | | | | |
| | C.I. Acid Yellow 132 | | | | | | |
| | C.I. Direct Yellow 86 | | | | | | |
| | C.I. Pigment Yellow 155 | | | | 0.6 | | |

TABLE 1-continued

| | | (M) | | | | | |
|---|---|---|---|---|---|---|---|
| | | Violetish magenta ink | | Reddish magenta ink | | Normal magemta ink | |
| | | MV-P | MV-D | MR-P | MR-D | MN-P | MN-D |
| | C.I. Pigment Yellow 83 | | | | | | |
| | C.I. Direct Red 80 | | | | | | 1.0 |
| | C.I. Acid Red 249 | | | | 2.5 | | 2.0 |
| | C.I. Acid Red 254 | | 2.5 | | | | |
| | C.I. Pigment Red 122 | 4.5 | | 4.25 | | 5.0 | |
| | C.I. Acid Blue 112 | | | | | | |
| | C.I. Direct Blue 86 | 0.5 | | | | | |
| | C.I. Direct Blue 199 | | | | | | |
| | C.I. Pigment Blue 15:3 | | | | | | |
| | C.I. Acid Green 3 | | | | | | |
| | Glycerin | 30.0 | 30.0 | 18.0 | 18.0 | 30.0 | 18.0 |
| | Dipropylene glycol-n-propyl ether | | | 2.0 | | | |
| | Triethylene glycol butyl ether | 3.0 | 4.0 | | | 4.0 | |
| | Tripropylene glycol butyl ether | | | | 0.5 | | 0.4 |
| | Polyoxyethylene lauryl ether ammonium sulfate (*1) | 1.0 | 1.0 | | | 1.0 | |
| | Ultra pure water | Balance | Balance | Balance | Balance | Balance | Balance |
| | h value/° | 345.0 | 342.2 | 5.6 | 2.1 | 351.2 | 357.8 |

TABLE 1

| | | (C) | | | | | |
|---|---|---|---|---|---|---|---|
| | | Greenish cyan ink | | Bluish cyan ink | | Normal cyan ink | |
| | | CG-P | CG-D | CB-P | CB-D | CN-P | CN-D |
| Ink composition (wt %) | Type of coloring agent | Pigment | Dye | Pigment | Dye | Pigment | Dye |
| | C.I. Acid Yellow 23 | | | | | | |
| | C.I. Acid Yellow 132 | | | | | | |
| | C.I. Direct Yellow 86 | | | | | | |
| | C.I. Pigment Yellow 155 | | | | | | |
| | C.I. Pigment Yellow 83 | | | | | | |
| | C.I. Direct Red 80 | | | | | | |
| | C.I. Acid Red 249 | | | | | | |
| | C.I. Acid Red 254 | | | | | | |
| | C.I. Pigment Red 122 | | | | | | |
| | C.I. Acid Blue 112 | | | | 3.0 | | |
| | C.I. Direct Blue 86 | | 2.5 | | | | |
| | C.I. Direct Blue 199 | | | | | | 3.0 |
| | C.I. Pigment Blue 15:3 | 3.8 | | 4.0 | | 2.0 | |
| | C.I. Acid Green 3 | 0.2 | 0.1 | | | | |
| | Glycerin | 30.0 | 30.0 | 18.0 | 18.0 | 30.0 | 30.0 |
| | Dipropylene glycol-n-propyl ether | 2.0 | | 2.0 | | | 2.0 |
| | Triethylene glycol butyl ether | | 4.0 | | | 4.0 | |
| | Tripropylene glycol butyl ether | | | | 0.5 | | |
| | Polyoxyethylene lauryl ether ammonium sulfate (*1) | 1.0 | | 1.0 | | 1.0 | |
| | Ultra pure water | Balance | Balance | Balance | Balance | Balance | Balance |
| | h value/° | 232.6 | 233.1 | 253.1 | 257.9 | 248.5 | 243.5 |

TABLE 2

| | | Ex. 1 | Ex. 2 | Ex. 3 | Ex. 4 | Comp. Ex. 1 | Comp. Ex. 2 |
|---|---|---|---|---|---|---|---|
| | Yellow ink | YR-D/YG-P | YR-P/YG-D | YR-P/YG-D | YN-D | LC600Y(*1) | YR-D/YG-D |
| | Magenta ink | MV-D/MR-P | MV-P/MR-D | MV-D/MR-P | MV-P/MR-D | LC600M(*2) | LC600M(*2) |
| | Cyan ink | CG-D/CB-P | CG-P/CB-D | CG-P/CB-D | CG-D/CB-P | LC600C(*3) | LC600C(*3) |
| $L^* = 40$ | Area(*4) | 19334 | 18754 | 19005 | 16898 | 13797 | 14777 |
| | Area ratio(*5) | 140.1 | 135.9 | 137.7 | 122.5 | — | 107.1 |
| | Color(*6) | A | A | A | A | — | B |
| $L^* = 50$ | Area(*4) | 22471 | 22586 | 22786 | 23258 | 21388 | 22928 |
| | Area ratio(*5) | 105.1 | 105.6 | 106.5 | 108.7 | — | 107.2 |
| | Color(*6) | B | B | B | B | — | B |

TABLE 2-continued

|  |  |  |  |  |  |  |  |
|---|---|---|---|---|---|---|---|
| $L^* = 60$ | Area(*4) | 22565 | 23568 | 23879 | 22856 | 21785 | 24595 |
|  | Area ratio(*5) | 105.5 | 108.2 | 109.6 | 104.9 | — | 112.9 |
|  | Color(*6) | B | B | B | C | — | A |
| $L^* = 70$ | Area(*4) | 17334 | 18372 | 18001 | 17568 | 16365 | 17563 |
|  | Area ratio(*5) | 105.9 | 112.3 | 110.0 | 107.4 | — | 107.3 |
|  | Color(*6) | B | A | A | B | — | B |
| $L^* = 80$ | Area(*4) | 12249 | 12564 | 11689 | 12672 | 11882 | 15624 |
|  | Area ratio(*5) | 103.1 | 105.7 | 98.4 | 106.6 | — | 131.5 |
|  | Color(*6) | C | B | C | B | — | A |
| Overall evaluation of color reproducibility |  | Good | Good | Good | Good | — | Good |
| Evaluation of light fastness |  | A | A | A | A | C | C |
| Evaluation of blurring |  | A | A | A | A | C | C |
| Remark |  | The color developing property is well-balanced over the entire region. | The color developing property is well-balanced over the entire region. | The color developing property is good in a blue region. | The color developing property is good in red and green regions. |  | The color reproduction range is broadened, but the results of evaluation of light fastness and blurring are bad. |

|  |  | Comp. Ex. 3 | Comp. Ex. 4 | Comp. Ex. 5 | Comp. Ex. 6 |
|---|---|---|---|---|---|
|  | Yellow ink | LC600Y(*1) | YN-D | YR-P/YG-P | YR-D/YG-D |
|  | Magenta ink | MV-D/MR-D | LC600M(*2) | LC600M(*2) | LC600M(*2) |
|  | Cyan ink | LC600C(*3) | CG-D/CB-D | LC600C(*3) | LC600C(*3) |
| $L^* = 40$ | Area(*4) | 17826 | 15874 | 16658 | 17854 |
|  | Area ratio(*5) | 129.2 | 115.1 | 120.7 | 129.4 |
|  | Color(*6) | A | A | A | A |
| $L^* = 50$ | Area(*4) | 22650 | 23564 | 24187 | 24865 |
|  | Area ratio(*5) | 105.9 | 110.2 | 113.1 | 116.3 |
|  | Color(*6) | B | A | A | A |
| $L^* = 60$ | Area(*4) | 23789 | 23541 | 19857 | 18547 |
|  | Area ratio(*5) | 109.0 | 108.1 | 91.1 | 85.1 |
|  | Color(*6) | B | B | C | D |
| $L^* = 70$ | Area(*4) | 18978 | 16875 | 14560 | 13424 |
|  | Area ratio(*5) | 116.0 | 103.1 | 89.0 | 82.0 |
|  | Color(*6) | A | C | D | D |
| $L^* = 80$ | Area(*4) | 12500 | 10856 | 10668 | 10987 |
|  | Area ratio(*5) | 105.2 | 91.4 | 89.8 | 92.5 |
|  | Color(*6) | B | C | D | C |
| Overall evaluation of color reproducibility |  | Good | Good | No Good | No Good |
| Evaluation of light fastness |  | C | C | B | A |
| Evaluation of blurring |  | C | C | B | B |
| Remark |  | The color reproduction range is broadened, but the results of evaluation of light fastness and blurring are bad. | The color reproduction range is slightly broadened, but the results of evaluation of light fastness and blurring are bad. | Blurring is noticeable in red and blue regions, and the color developing property is unsatisfactory in a yellow region. | The color reproduction range is narrow in a red region. |

(*1)Commercial normal yellow dye ink,
(*2)Commercial normal magenta dye ink,
(*3)Commercial normal cyan dye ink,
(*4)Area = color reproduction area,
(*5)Area ratio = area ratio with respect to Comparative Example 1,
(*6)Color = Color reproducibility In the ink sets of Examples 1 to 4, two inks having therebetween the color range of the normal color were employed for each of the yellow, magenta and cyan inks in place of the corresponding normal color ink. In this case, the employed inks themselves had an excellent color developing property. As can be seen from the results in Table 2, by combining a plurality of inks as described above, good intermediate colors can be developed. In addition, the color reproducibility is improved as compared to that of the ink set of Comparative Example 1 in which the normal color ink is employed as each of the yellow, magenta and cyan inks. Particularly, the color reproducibility is improved even when the lightness (L*) is low.

Further, in any of the ink sets of Examples 1 to 4, the results of the light fastness evaluation and the blurring evaluation were satisfactory, and it was confirmed that a printed material having an excellent image storage property could be obtained. Particularly, in the ink set of Comparative Example 1 in which each of the yellow, magenta and cyan inks was a dye ink, the light fastness was very low in the color ranges developed by use of the magenta and yellow inks. Generally, color fading of the reddish magenta ink is noticeable by visual observation. In the ink sets of Examples 1 and 3, a pigment was employed as the coloring agent of the reddish magenta ink, and thus the color fading of magenta color or red color could be successfully prevented.

An intermediate hue between the hues of adjacent two inks may be developed by use of the two inks. Colors having such an intermediate hue include colors between the reddish magenta ink and the reddish yellow ink, colors between the greenish yellow ink and the greenish cyan ink, and colors between the bluish cyan ink and the violetish magenta ink. In the ink sets of Examples 1 and 2, the coloring agents of the inks are composed such that the dyes and the pigments are alternately arranged in order of hue angle. Thus, if such an intermediate color is developed by use of two inks which have different hues having therebetween the hue of the intermediate color, one of the coloring agents of the two inks is a dye, and the other coloring agent is a pigment. Therefore, the color developing balance is excellent over the entire color range, and a uniform color reproduction range can be achieved. Moreover, in regard to image storage stability related to the light fastness, color fading did not occur in a particular color range, and thus well-balanced image stability was obtained over the entire color range.

On the other hand, in the ink sets of Comparative Examples 2 to 4, good intermediate colors could be developed, and excellent color reproducibility was achieved. However, each of the inks constituting the ink set was composed of a dye ink only, and a pigment ink was not included therein. Therefore, before and after the light irradiation, color fading was evidently found. In addition, the letters and the ruled lines were not sharp, and blurring was found. Thus, small letters were difficult to read.

In the ink set of Comparative Example 5, a dye ink was employed as the magenta based ink and the cyan based ink. Thus, the light fastness of the hue of these color inks were low, and the difference of the image quality was found before and after the light irradiation. In addition, the letters and the ruled lines were not sharp, and blurring was found particularly in a red region and a blue region. Further, since a pigment ink was employed as both the two yellow based inks, colors in general were not satisfactorily developed in a yellow region, and thus the color reproducibility could not be improved when the lightness (L*) was high.

In the ink set of Comparative Example 6, no image quality differences related to the light fastness were found before and after the light irradiation, and the letters were clearly readable regardless of the size thereof. However, a dye ink was employed as both the two yellow based inks, and a pigment ink was employed as both the two magenta based inks. Thus, the letters and the ruled lines were not sharp, and blurring was found.

According to the water-based ink set for ink-jet recording of the present invention, excellent image reproducibility is achieved by a wide range of color reproducibility. Therefore, the inks of this ink set are suitable for a printer for ink-jet recording.

The entire disclosure of the specification, claims, summary and drawings of Japanese Patent Application No. 2005-150808 filed on May 24, 2005 is hereby incorporated by reference.

What is claimed is:

1. A water-based ink set for ink-jet recording comprising a plurality of color inks,
   each of at least one of said plurality of color inks comprising a first ink and a second ink, said first ink having a first hue angle and said second ink having a second hue angle,
   wherein said first hue angle is not equal to said second hue angle and a differential range therebetween comprises a hue angle color range of a normal color of said at least one of said plurality of color inks; and
   a coloring agent of one of the first ink and the second ink is a pigment, and a coloring agent of the other thereof is a dye.

2. The water-based ink set for ink-jet recording according to claim 1, wherein said normal color is yellow, said first ink is a reddish yellow ink having said first hue angle of approximately 70° to approximately 85° and said second ink is a greenish yellow ink having said second hue angle of approximately 95° to approximately 110°.

3. The water-based ink set for ink-jet recording according to claim 1, wherein said normal color is magenta, said first ink is a violetish magenta ink having said first hue angle of approximately 340° to approximately 350° and said second ink is a reddish magenta ink having said second hue angle of approximately 0° to approximately 10°.

4. The water-based ink set for ink-jet recording according claim 1, wherein said normal color is cyan, said first ink is a greenish cyan ink having said first hue angle of approximately 230° to approximately 240° and said second ink is a bluish cyan ink having said second hue angle of approximately 250° to approximately 260°.

5. The water-based ink set for ink-jet recording according to claim 1, wherein each of said plurality of color inks comprises said first ink and said second ink, and the coloring agents of the inks are composed such that the dyes and the pigments are alternately arranged in order of hue angle.

6. The water-based ink set for ink-jet recording according to claim 1, wherein
   the normal colors of two of said plurality of color inks are yellow and magenta:
   said first ink of said color ink having a normal color of yellow is a reddish yellow ink having said first hue angle of approximately 70° to approximately 85° and employing a dye as the coloring agent, and said second ink of said color ink having a normal color of yellow is a greenish yellow ink having said second hue angle of approximately 95° to approximately 110° and employing a pigment as the coloring agent; and
   said first ink of said color ink having a normal color of magenta is a violetish magenta ink having said first hue angle of approximately 340° to approximately 350° and employing a dye as the coloring agent, and said second ink of the color ink having a normal color of magenta is a reddish magenta ink having said second hue angle of approximately 0° to approximately 10° and employing a pigment as the coloring agent.

7. The water-based ink set for ink-jet recording according to claim 1, wherein
   the normal colors of two of said plurality of color inks are magenta and cyan:
   said first ink of said color ink having a normal color of magenta is a violetish magenta ink having said first hue angle of approximately 340° to approximately 350° and employing a dye as the coloring agent, and said second ink of the color ink having a normal color of magenta is a reddish magenta ink having said second hue angle of approximately 0° to approximately 10° and employing a pigment as the coloring agent; and said first ink of said color ink having a normal color of cyan is a greenish cyan ink having said first hue angle of approximately 230° to approximately 240° and employing a dye as the coloring agent, and said second ink of said color ink having a normal color of cyan is a bluish cyan ink having said second hue angle of approximately 250° to approximately 260° and employing a pigment as the coloring agent.

8. The water-based ink set for ink-jet recording according to claim 1, wherein the normal colors of two of said plurality of color inks are yellow and cyan:

said first ink of said color ink having a normal color of yellow is a reddish yellow ink having said first hue angle of approximately 70° to approximately 85° and employing a dye as the coloring agent, and said second ink of said color ink having a normal color of yellow is a greenish yellow ink having said second hue angle of approximately 95° to approximately 110° and employing a pigment as the coloring agent; and said first ink of said color ink having a normal color of cyan is a greenish cyan ink having said first hue angle of approximately 230° to approximately 240° and employing a dye as the coloring agent, and said second ink of said color ink having a normal color of cyan is a bluish cyan ink having said second hue angle of approximately 250° to approximately 260° and employing a pigment as the coloring agent.

9. The water-based ink set for ink-jet recording according to claim 1, wherein the normal colors of three of said plurality of color inks are yellow, magenta and cyan:

said first ink of said color ink having a normal color of yellow is a reddish yellow ink having said first hue angle of approximately 70° to approximately 85° and employing a dye as the coloring agent, and said second ink of said color ink having a normal color of yellow is a greenish yellow ink having said second hue angle of approximately 95° to approximately 110° and employing a pigment as the coloring agent;

said first ink of said color ink having a normal color of magenta is a violetish magenta ink having said first hue angle of approximately 340° to approximately 350° and employing a dye as the coloring agent, and said second ink of the color ink having a normal color of magenta is a reddish magenta ink having said second hue angle of approximately 0° to approximately 10° and employing a pigment as the coloring agent; and said first ink of said color ink having a normal color of cyan is a greenish cyan ink having said first hue angle of approximately 230° to approximately 240° and employing a dye as the coloring agent, and said second ink of said color ink having a normal color of cyan is a bluish cyan ink having said second hue angle of approximately 250° to approximately 260° and employing a pigment as the coloring agent.

\* \* \* \* \*